(12) United States Patent
Sato

(10) Patent No.: US 9,025,577 B2
(45) Date of Patent: May 5, 2015

(54) WIRELESS BASE STATION AND WIRELESS COMMUNICATION METHOD

(75) Inventor: Yoshizo Sato, Daito (JP)

(73) Assignee: KYOCERA Corporation, Kyoto (JP)

( * ) Notice: Subject to any disclaimer, the term of this patent is extended or adjusted under 35 U.S.C. 154(b) by 186 days.

(21) Appl. No.: 13/810,993

(22) PCT Filed: Jul. 21, 2011

(86) PCT No.: PCT/JP2011/066602
§ 371 (c)(1),
(2), (4) Date: Mar. 14, 2013

(87) PCT Pub. No.: WO2012/011537
PCT Pub. Date: Jan. 26, 2012

(65) Prior Publication Data
US 2013/0176996 A1   Jul. 11, 2013

(30) Foreign Application Priority Data
Jul. 22, 2010   (JP) .................................. 2010-165111

(51) Int. Cl.
H04W 72/04   (2009.01)
H04L 25/03   (2006.01)
H04B 7/06   (2006.01)

(52) U.S. Cl.
CPC .......... *H04W 72/042* (2013.01); *H04W 72/046* (2013.01); *H04L 25/03949* (2013.01); *H04B 7/0617* (2013.01)

(58) Field of Classification Search
CPC ..... H04W 84/18; H04W 84/12; H04W 88/08; H04W 72/04; H04W 76/00; H04W 72/042; A01B 12/006; H04L 25/03949; H04B 7/0617

USPC ......... 370/328, 329, 330, 331, 334, 336, 338, 370/341
See application file for complete search history.

(56) References Cited

U.S. PATENT DOCUMENTS

| | | | |
|---|---|---|---|
| 2009/0042615 A1 | 2/2009 | Teo et al. | |
| 2009/0323664 A1* | 12/2009 | Li et al. | 370/344 |
| 2010/0069028 A1 | 3/2010 | Choi et al. | |
| 2011/0013536 A1* | 1/2011 | Falahati et al. | 370/252 |
| 2012/0134316 A1* | 5/2012 | Seo et al. | 370/315 |

FOREIGN PATENT DOCUMENTS

| | | |
|---|---|---|
| JP | 2009-060595 A | 3/2009 |
| JP | 2010-028192 A | 2/2010 |
| JP | 2010-518675 A | 5/2010 |

OTHER PUBLICATIONS

International Search Report dated Sep. 13, 2011, issued for International Application No. PCT/JP2011/066602.

* cited by examiner

*Primary Examiner* — Anh Ngoc Nguyen
(74) *Attorney, Agent, or Firm* — Procopio, Cory, Hargreaves & Savitch LLP

(57) ABSTRACT

A resource determination unit determines at least a part within any downlink subframe as a first resource and determines at least a part of an UpPTS (Uplink Pilot Timeslot) or a part of an uplink subframe as a second resource for transmitting an SRS (Sounding Reference Signal). A transmission path state estimation unit estimates a state of a transmission path to a wireless terminal based on a DRS (Demodulation Reference Signal) included in uplink user data after the first resource is determined and until it receives an SRS, and it estimates a state of the transmission path to the wireless terminal based on an SRS after it received the SRS.

5 Claims, 8 Drawing Sheets

WIRELESS BASE STATION AND WIRELESS COMMUNICATION METHOD

TECHNICAL FIELD

The present invention relates to a wireless base station and a wireless communication method, and particularly to a wireless base station estimating a state of a transmission path based on a sounding signal and a wireless communication method.

BACKGROUND ART

In a wireless communication system adapted to an LTE scheme or the like, of which specifications have been developed in 3GPP (3rd Generation Partnership Project), a wireless terminal transmits a reference signal to a wireless base station. The wireless base station estimates a state of a transmission path based on the received reference signal and forms antenna directivity for downlink user data.

A method of transmitting a reference signal includes such a method that a wireless terminal transmits a DRS (Demodulation Reference Signal) embedded in uplink user data and such a method that a wireless terminal transmits an SRS (Sounding Reference Signal) by using a part of an UpPTS (uplink part) in a switch subframe or a part of an uplink subframe (for example, a last symbol) (see, for example, PTL 1 (Japanese Patent Laying-Open No. 2010-28192)).

CITATION LIST

Patent Literature

PTL 1: Japanese Patent Laying-Open No. 2010-28192

SUMMARY OF INVENTION

Technical Problem

The method of transmitting a DRS as a reference signal is advantageous in that a time period from determination of a wireless resource from which a wireless base station transmits downlink user data until actual transmission of the downlink user data by the wireless base station with the use of that wireless resource is short. There is a case, however, that a valuable wireless resource which can be used for transmission of uplink user data in all wireless terminals is used only for transmission of a DRS and waste of a wireless resource gives rise to a problem.

Meanwhile, in a method of transmitting an SRS as a reference signal, since an SRS is not transmitted as being embedded in uplink user data, waste of the wireless resource can be avoided. Disadvantageously, however, a time period from determination of a wireless resource for downlink user data by a wireless base station until actual transmission of the downlink user data by the wireless base station with the use of that wireless resource is long.

Therefore, an object of the present invention is to provide a wireless base station and a wireless communication method capable of avoiding waste of a wireless resource and decreasing a time period from determination of a wireless resource for downlink user data until actual transmission of downlink user data with the use of that wireless resource.

Solution To Problem

The present invention includes a resource determination unit for determining at least a part within any downlink subframe as a first resource for periodically transmitting downlink user data to a wireless terminal and determining at least a part of an uplink part within a switch subframe or a part of an uplink subframe as a second resource for the wireless terminal to periodically transmit a first sounding reference signal, a resource notification unit for notifying the wireless terminal of the determined second resource, a transmission path state estimation unit for estimating a state of a transmission path to the wireless terminal based on a second sounding reference signal included in uplink user data received from the wireless terminal after determination of the first resource and until reception of the first sounding reference signal from the wireless terminal and estimating a state of a transmission path to the wireless terminal based on the first sounding reference signal after reception of the first sounding reference signal, and a transmission unit for forming directivity of a plurality of antennas based on the estimated state of the transmission path and transmitting the downlink user data through the first resource.

DESCRIPTION OF EMBODIMENTS

An embodiment of the present invention will be described hereinafter with reference to the drawings.

(Configuration of Wireless Communication System)

Figure 1:
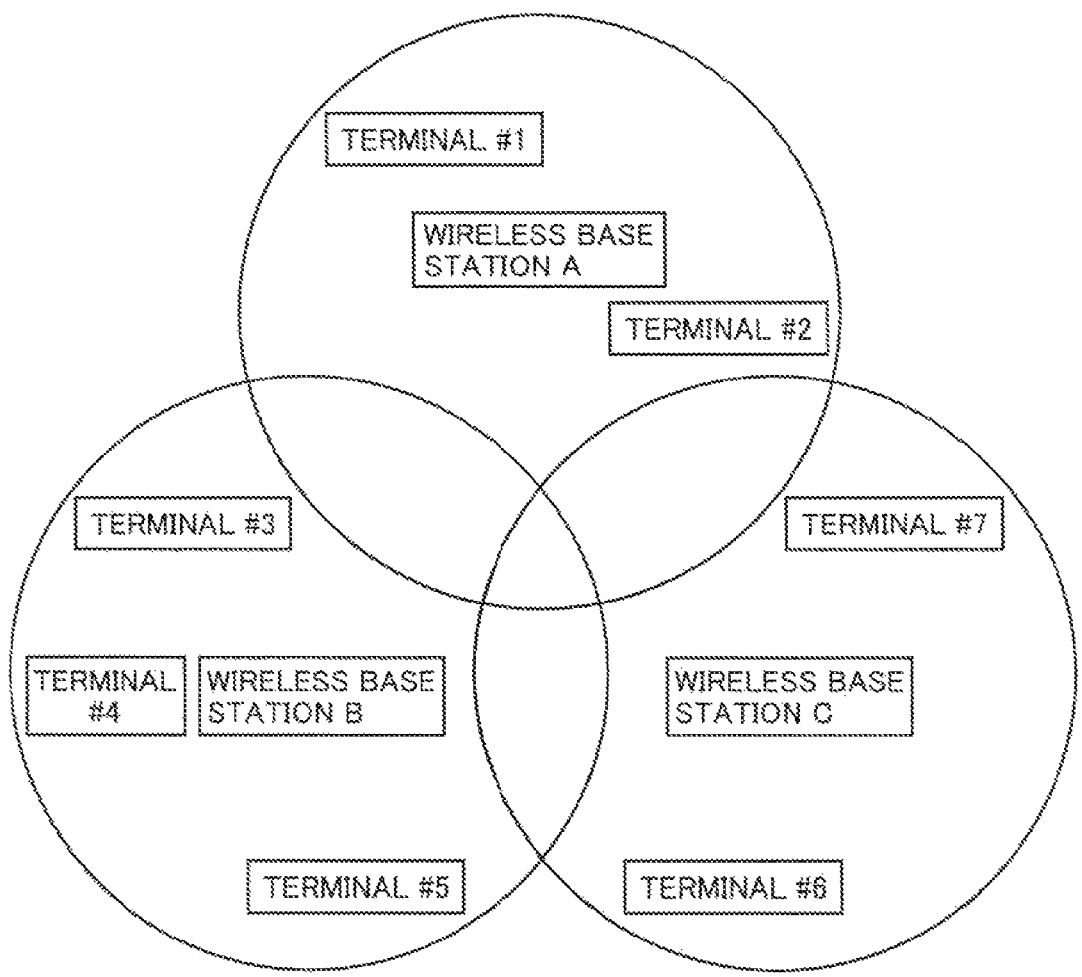
FIG. 1 is a diagram showing a configuration of a wireless communication system in an embodiment of the present invention.

FIG. 1 is a diagram showing a configuration of a wireless communication system in an embodiment of the present invention.

Referring to FIG. 1, this wireless communication system is a communication system adapted to an LTE (Long Term Evolution) scheme, in which a plurality of wireless base stations A, B, C communicate with wireless terminals within their zones shown with circles in the figure, respectively. These wireless base stations A, B, C receive uplink signals and transmit downlink signals at the same timing.

(Configuration of Wireless Base Station)

Figure 2:
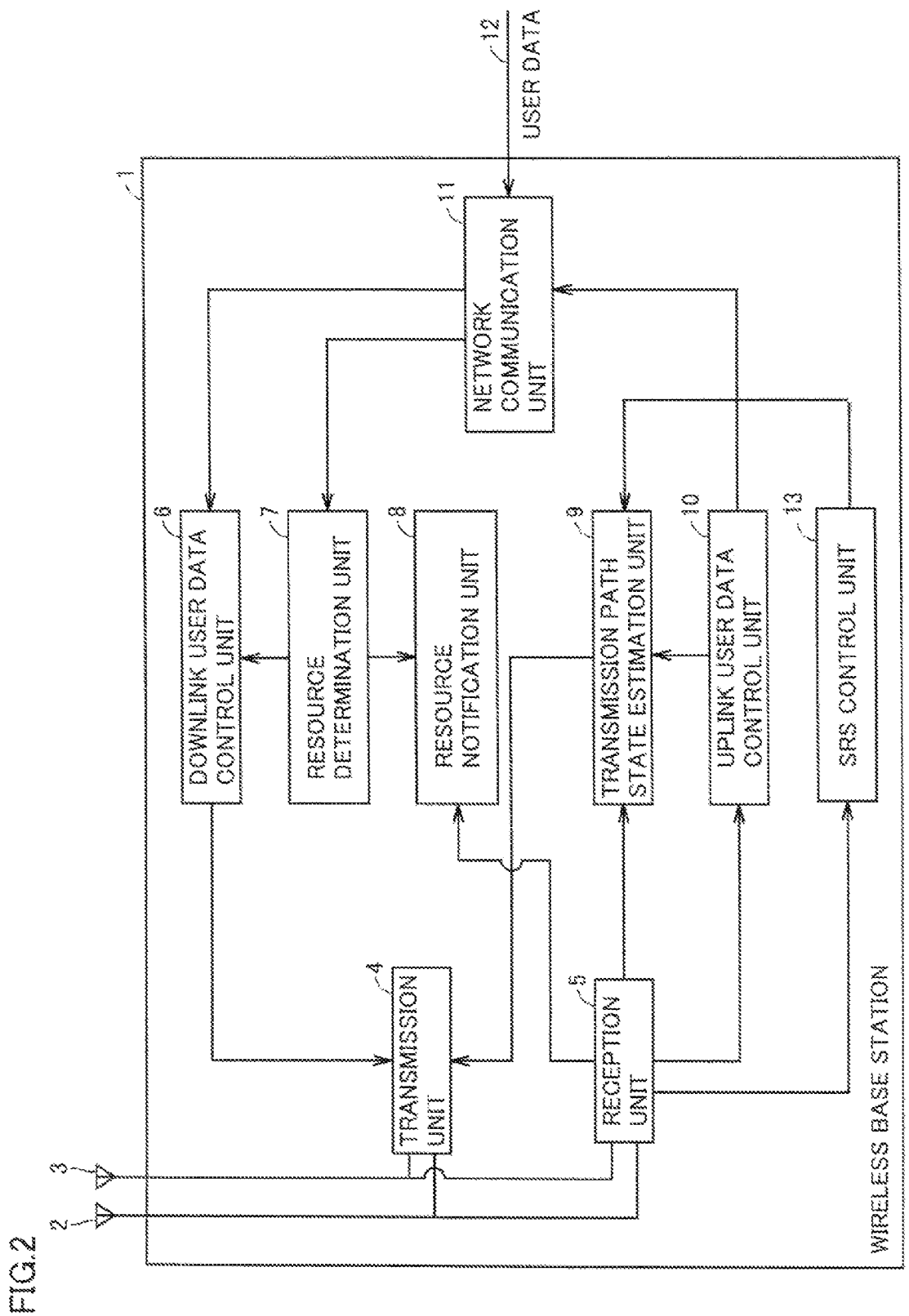
FIG. 2 is a diagram showing a configuration of a wireless base station in the embodiment of the present invention.

FIG. 2 is a diagram showing a configuration of a wireless base station in the embodiment of the present invention.

Referring to FIG. 2, this wireless base station 1 includes a plurality of antennas 2, 3, a transmission unit 4, a reception unit 5, a downlink user data control unit 6, an uplink user data control unit 10, an SRS control unit 13, a resource determination unit 7, a resource notification unit 8, a transmission path state estimation unit 9, and a network communication unit 11.

Transmission unit 4 transmits downlink user data and a control signal such as an RRC (Radio Resource Control) connection re-setting message or an uplink user data/downlink user data allocation message to a wireless terminal through the plurality of antennas 2, 3. Transmission unit 4 forms directivity of the plurality of antennas 2, 3 based on a state of a transmission path for each sub carrier estimated by transmission path state estimation unit 9 and transmits downlink user data. For example, transmission unit 4 subjects downlink user data to adaptive array transmission processing (weight control) in accordance with a state of a transmission path and forms directivity of antenna 2, 3. Here, formation of antenna directivity includes beam forming for directing beams (a portion intensely receiving/transmitting a signal) to a desired communication counterpart and null steering for directing null (a portion substantially not receiving/transmitting a signal) in an unwanted signal source direction or in a direction in which interference is not desirably effected.

Reception unit 5 receives uplink user data and a control signal such as an SRS, an RRC connection re-setting completion message, and the like from a wireless terminal through the plurality of antennas 2, 3.

Downlink user data control unit 6 holds downlink user data received from a not-shown control center through network communication unit 11.

Uplink user data control unit 10 transmits uplink user data received from a wireless terminal to the not-shown control center through network communication unit 11. In addition, uplink user data control unit 10 outputs a DRS included in the received uplink user data to transmission path state estimation unit 9.

SRS control unit 13 outputs the SRS received from the wireless terminal to transmission path state estimation unit 9.

When the downlink user data control unit 6 receives downlink user data, resource determination unit 7 determines at least a part within any downlink subframe as a first resource from which downlink user data to a wireless terminal is periodically transmitted. Resource determination unit 7 determines a part of an UpPTS (uplink part) within a switch subframe as a second resource for a wireless terminal to periodically transmit an SRS. Resource determination unit 7 determines at least a part within any uplink subframe UL as a third resource for periodically transmitting uplink user data including a DRS for a prescribed period.

Resource notification unit 8 transmits an uplink user data/downlink user data allocation message representing the determined first resource and third resource to a wireless terminal. Resource notification unit 8 transmits an RRC connection re-setting message representing the determined second resource to the wireless terminal. Resource notification unit 8 receives an RRC connection re-setting completion message from the wireless terminal.

Transmission path state estimation unit 9 estimates a state of a transmission path based on an SRS or a DRS.

Network communication unit 11 receives downlink user data from a control center through a network 12. Network communication unit 11 transmits uplink user data to the control center through network 12.

(Configuration of Wireless Terminal)

Figure 3:
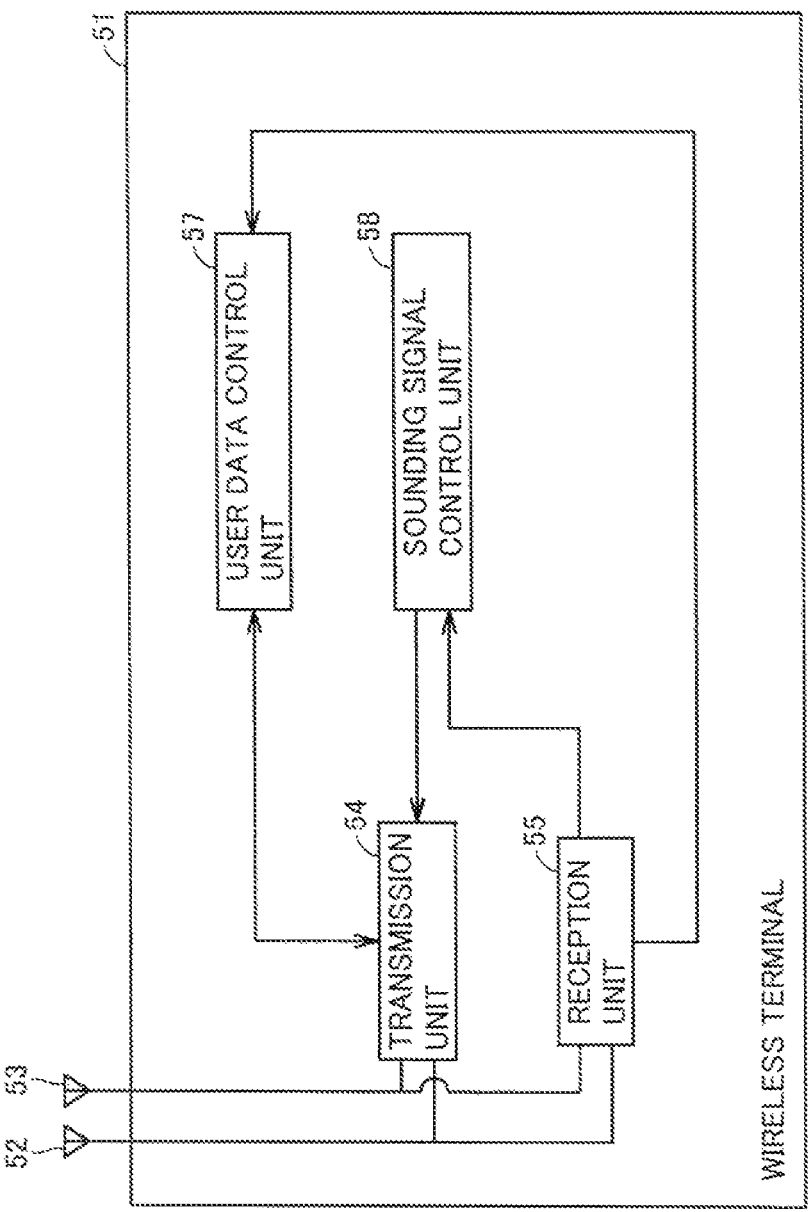
FIG. 3 is a diagram showing a configuration of a wireless terminal in the embodiment of the present invention.

FIG. 3 is a diagram showing a configuration of a wireless terminal in the embodiment of the present invention.

Referring to FIG. 3, this wireless terminal 51 includes a plurality of antennas 52, 53, a transmission unit 54, a reception unit 55, a user data control unit 57, and a sounding signal control unit 58.

Reception unit 55 receives from wireless base station 1, downlink user data and a control signal such as an RRC connection re-setting message through the plurality of antennas 52, 53.

Transmission unit 54 transmits uplink user data and a control signal such as an SRS and an RRC connection re-setting completion message to wireless base station 1 through the plurality of antennas 52, 53.

User data control unit 57 holds and controls downlink user data received from wireless base station 1 and uplink user data to be transmitted to wireless base station 1.

When sounding signal control unit 58 receives an RRC connection re-setting message, sounding signal control unit 58 allocates a wireless resource from which an SRS is to be transmitted, based on the RRC connection re-setting message. Thereafter, sounding signal control unit 58 transmits an RRC connection re-setting completion message. Sounding signal control unit 58 transmits an SRS by using the allocated wireless resource.

(Configuration of Frame)

Figure 4:
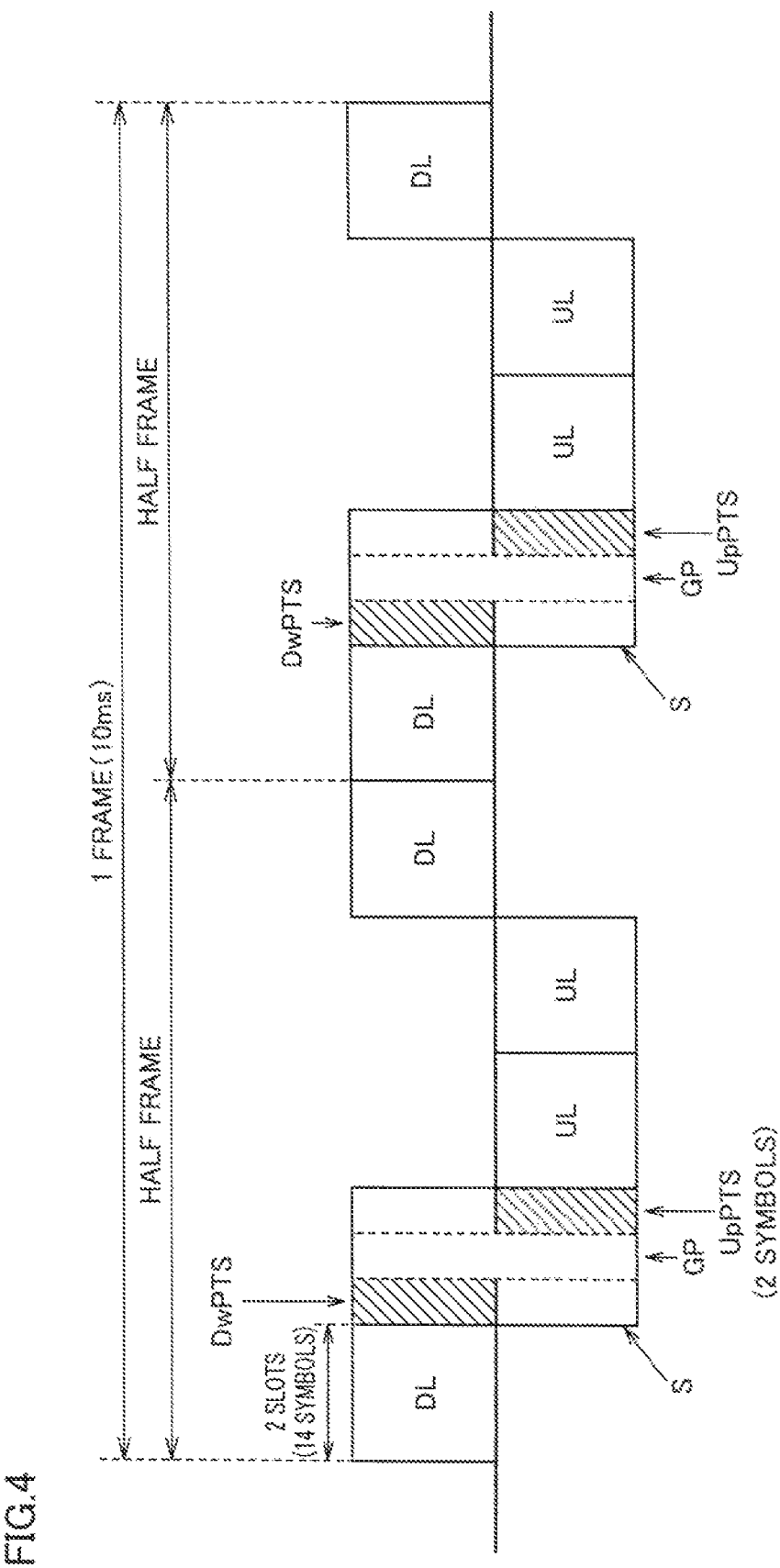
FIG. 4 is a diagram showing a configuration of a frame transmitted in the wireless communication system in the embodiment of the present invention.

FIG. 4 is a diagram showing a configuration of a frame transmitted in the wireless communication system in the embodiment of the present invention.

Referring to FIG. 4, a configuration of this frame is a configuration at the time when an (Uplink-downlink configuration) in the LTE is set to "1".

As shown in FIG. 4, one frame is transmitted in a time period of 10 ms. One frame is divided into half frames. Each half frame is formed, in time sequence, of a downlink subframe DL, a switch subframe S, two consecutive uplink subframes UL, and a downlink subframe DL.

Here, switch subframe S is formed of a DwPTS (Downlink Pilot Timeslot), a GP (Guard Period), and an UpPTS (Uplink Pilot Timeslot; also referred to as an uplink part). The UpPTS is formed of 2 symbols.

(Timing in Embodiment of the Present Invention)

Figure 5:
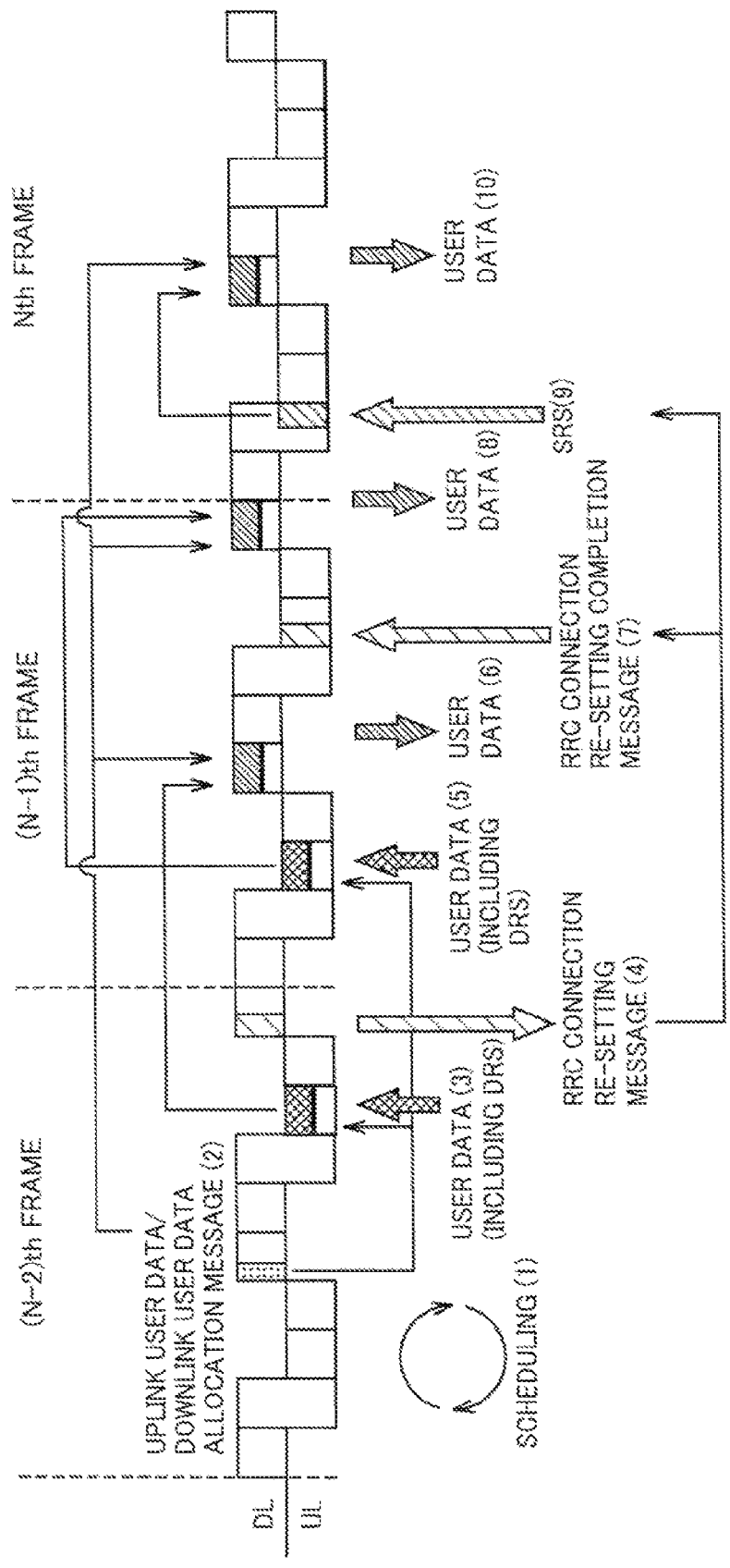
FIG. 5 is a diagram for illustrating timing in the embodiment of the present invention.

FIG. 5 is a diagram for illustrating timing in the embodiment of the present invention.

Referring to FIG. 5, initially, in an (N−2)th frame, wireless base station 1 determines the first resource from which downlink user data is to periodically be transmitted in a prescribed downlink subframe DL in an (N−1)th frame and a subsequent frame (that is, with a half frame being defined as a cycle), a third resource from which uplink user data including a DRS is to periodically be transmitted for a prescribed period (that is, only twice with a half frame being defined as a cycle) in wireless terminal 51 which is a destination of downlink user data, and a second resource from which an SRS is periodically transmitted (with a half frame being defined as a cycle) in wireless terminal 51 which is the destination of downlink user data (shown with (1)). Wireless base station 1 transmits an uplink user data/downlink user data allocation message representing these determined first resource and third resource (shown with (2)). Wireless terminal 51 transmits uplink user data including a DRS by using the third resource of which notification has been given (shown with (3)). Wireless base station 1 transmits an RRC connection re-setting message representing the determined second resource (shown with (4)).

In the (N−1)th frame, wireless terminal 51 transmits the uplink user data including the DRS by using the third resource of which notification has been given (shown with (5)).

Wireless base station 1 estimates a state of a transmission path to wireless terminal 51 based on the received DRS received at (3). Wireless base station 1 forms directivity of the plurality of antennas based on the estimated state of the transmission path and transmits the downlink user data (shown with (6)). Wireless terminal 51 transmits an RRC connection re-setting completion message (shown with (7)).

In the last subframe in the (N−1)th frame and first and second subframes in an Nth frame, wireless base station 1 estimates a state of the transmission path to wireless terminal 51 based on the received DRS received at (5). Wireless base station 1 forms directivity of the plurality of antennas based on the estimated state of the transmission path and transmits the downlink user data (shown with (8)).

In the Nth frame, wireless terminal 51 transmits an SRS through the UpPTS (shown with (9)). Wireless base station 1 estimates a state of the transmission path to wireless terminal 51 based on the received SRS. Wireless base station 1 forms directivity of the plurality of antennas based on the estimated state of the transmission path and transmits the downlink user data (shown with (10)).

(Reference 1: Timing in Method of Transmitting DRS as Reference Signal)

Then, for the purpose of reference, timing in a method of transmitting a DRS as a reference signal described in the Background Art will be described.

Figure 6:
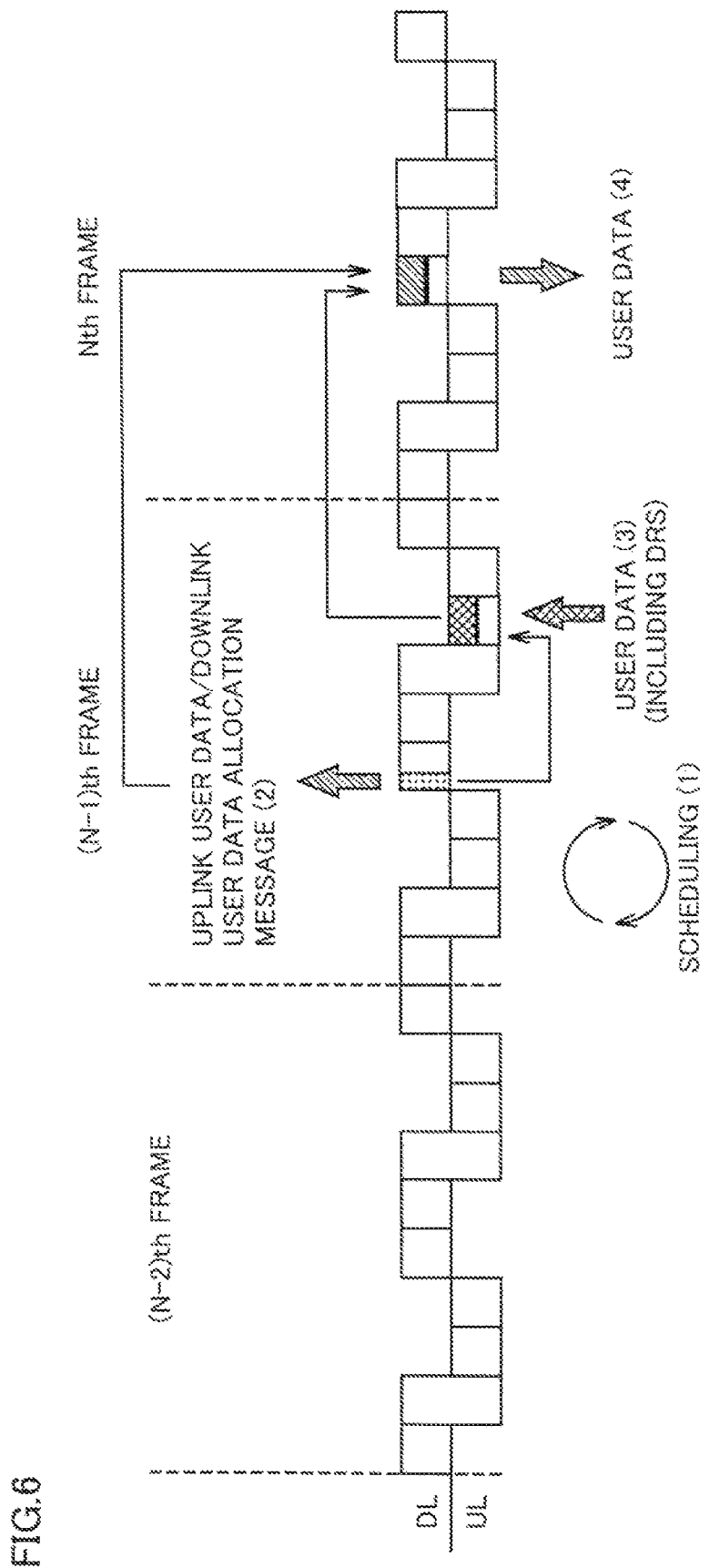
FIG. 6 is a diagram for illustrating timing in a method of transmitting a DRS as a reference signal.

FIG. 6 is a diagram for illustrating timing in a method of transmitting a DRS as a reference signal.

Referring to FIG. 6, initially, in the (N−1)th frame, the wireless base station determines a resource from which downlink user data is to be transmitted in the Nth frame and a resource from which uplink user data including a DRS is to be transmitted in a wireless terminal which is a destination of the downlink user data (shown with (1)). The wireless base station transmits a message representing these determined resource from which downlink user data is to be transmitted and resource from which uplink user data including the DRS is to be transmitted (shown with (2)). The wireless terminal transmits the uplink user data including the DRS by using the resource of which notification has been given (shown with (3)).

In the Nth frame, the wireless base station estimates a state of a transmission path to the wireless terminal based on the received DRS. The wireless base station forms directivity of the plurality of antennas based on the estimated state of the transmission path and transmits the downlink user data (shown with (4)).

(Reference 2: Timing in Method of Transmitting SRS as Reference Signal)

Then, timing in a method of transmitting an SRS as a reference signal described in the Background Art will be described.

Figure 7:
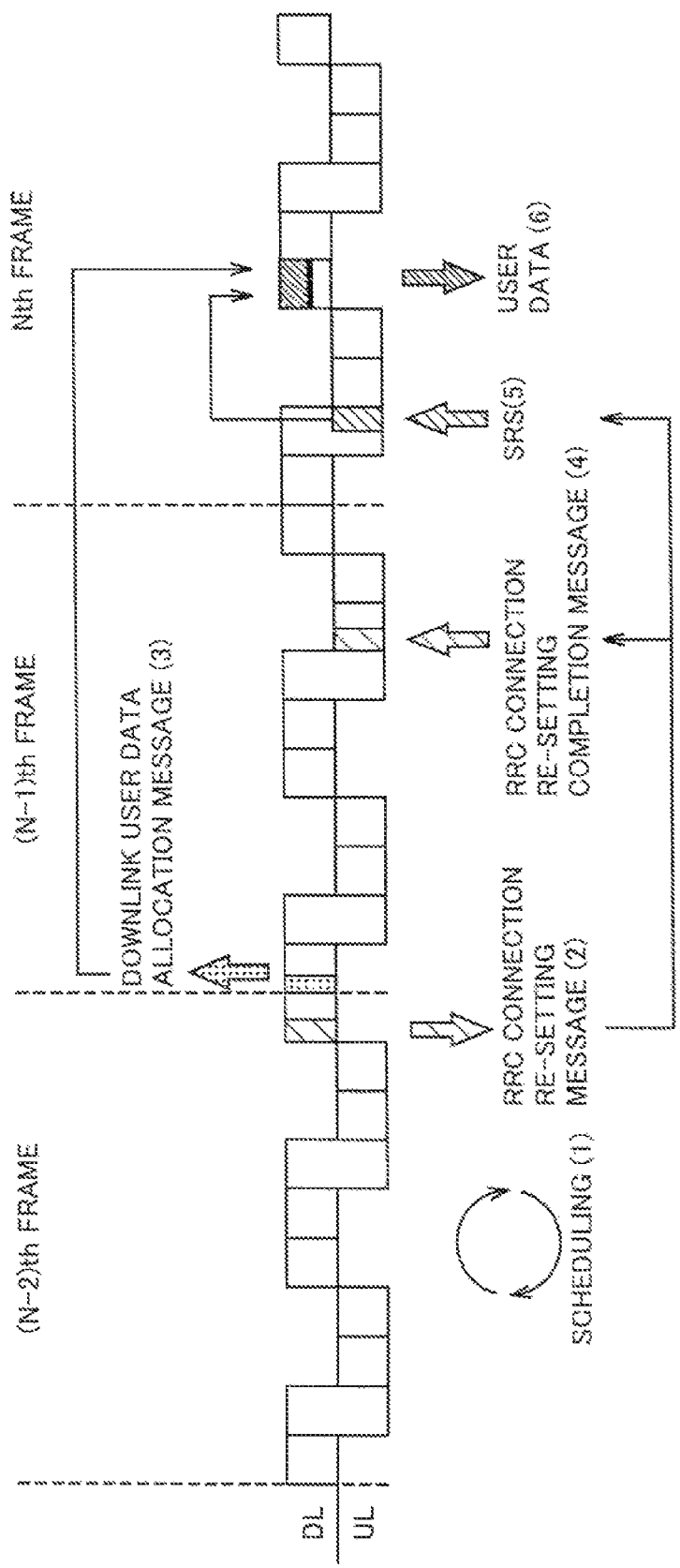
FIG. 7 is a diagram for illustrating timing in a method of transmitting an SRS as a reference signal.

FIG. 7 is a diagram for illustrating timing in a method of transmitting an SRS as a reference signal.

Referring to FIG. 7, initially, in the (N−2)th frame, the wireless base station determines a resource from which downlink user data is to be transmitted in the Nth frame and a resource from which an SRS is to be transmitted in a wireless terminal which is a destination of the downlink user data (shown with (1)). The wireless base station transmits an RRC connection re-setting message representing the determined resource from which the SRS is to be transmitted (shown with (2)).

In the (N−1)th frame, the wireless base station transmits a message representing the determined resource from which the downlink user data is to be transmitted (shown with (3)). The wireless terminal transmits an RRC connection re-setting completion message (shown with (4)).

In the Nth frame, the wireless terminal transmits the SRS through the UpPTS (shown with (5)). The wireless base station estimates a state of a transmission path to the wireless terminal based on the received SRS. The wireless base station forms directivity of the plurality of antennas based on the estimated state of the transmission path and transmits the downlink user data (shown with (6)).

(Operation Procedure)

Figure 8:
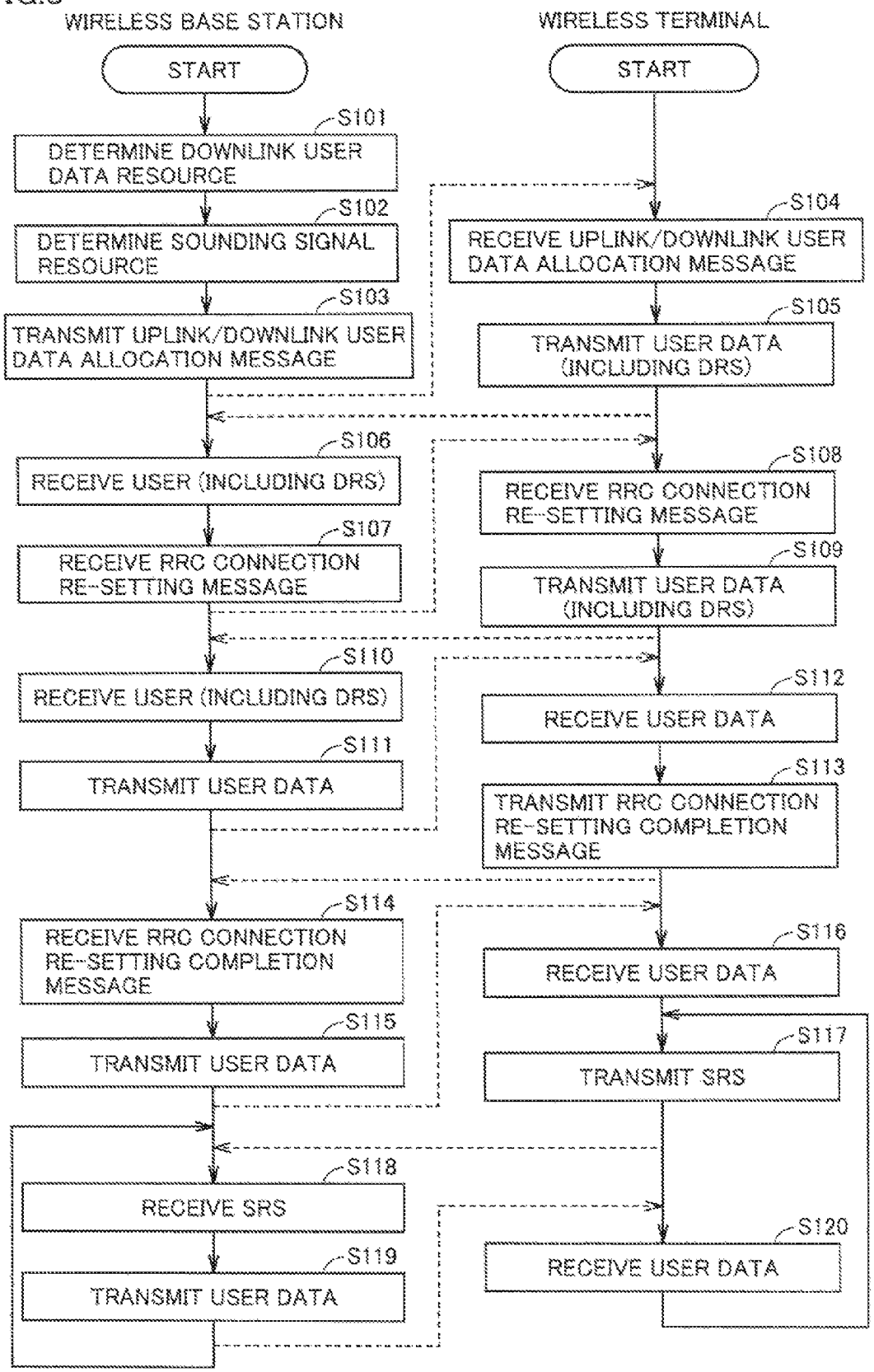
FIG. 8 is a flowchart showing an operation procedure in the wireless communication system in the embodiment of the present invention.

FIG. 8 is a flowchart showing an operation procedure in the wireless communication system in the embodiment of the present invention.

Referring to FIG. 8, initially, in step S101 and step S102, resource determination unit 7 of wireless base station 1 carries out scheduling. Namely, resource determination unit 7 of wireless base station 1 determines at least a part within any downlink subframe DL as the first resource for periodically transmitting downlink user data to wireless terminal 51 (step S101). In addition, resource determination unit 7 of wireless base station 1 determines any resource within the UpPTS in switch subframe S as the second resource for wireless terminal 51 to periodically transmit an SRS. Moreover, resource determination unit 7 of wireless base station 1 determines at least a part within any uplink subframe UL as the third resource for wireless terminal 51 to periodically transmit uplink user data including the DRS (step S102).

Then, resource notification unit 8 of wireless base station 1 transmits an uplink user data/downlink user data allocation message representing the determined first resource and third resource, as shown with (2) in FIG. 5 (step S103).

Then, user data control unit 57 of wireless terminal 51 receives the uplink user data/downlink user data allocation message representing the first resource and the third resource (step S104).

Then, user data control unit 57 of wireless terminal 51 transmits the uplink user data including the DRS by using the third resource of which notification has been given in step S104, as shown with (3) in FIG. 5 (step S105).

Then, uplink user data control unit 10 of wireless base station 1 receives the uplink user data including the DRS (step S106).

Then, resource notification unit 8 of wireless base station 1 transmits an RRC connection re-setting message representing the determined second resource, as shown with (4) in FIG. 5 (step S107).

Then, sounding signal control unit 58 of wireless terminal 51 receives the RRC connection re-setting message (step S108).

Then, user data control unit 57 of wireless terminal 51 transmits the uplink user data including the DRS by using the third resource of which notification has been given in step S104, as shown with (5) in FIG. 5 (step S109).

Then, uplink user data control unit 10 of wireless base station 1 receives the uplink user data including the DRS (step S110).

Then, transmission path state estimation unit 9 of wireless base station 1 estimates a state of a transmission path to wireless terminal 51 based on the DRS received in step S106. Transmission unit 4 of wireless base station 1 forms directivity of the plurality of antennas 2, 3 based on the estimated state of the transmission path based on the estimated state of the transmission path and transmits the downlink user data as shown with (6) in FIG. 5 (step S111).

Then, reception unit 55 of wireless terminal 51 receives the downlink user data through the plurality of antennas 52, 53 (step S112).

Then, sounding signal control unit 58 of wireless terminal 51 transmits an RRC connection re-setting completion message as shown with (7) in FIG. 5 (step S113).

Then, resource notification unit 8 of wireless base station 1 receives the RRC connection re-setting completion message (step S114).

Then, transmission path state estimation unit 9 of wireless base station 1 estimates a state of a transmission path to wireless terminal 51 based on the DRS received in step S110. Transmission unit 4 of wireless base station 1 forms directivity of the plurality of antennas 2, 3 based on the estimated state of the transmission path based on the estimated state of the transmission path and transmits the downlink user data as shown with (8) in FIG. 5 (step S115).

Then, reception unit 55 of wireless terminal 51 receives the downlink user data through the plurality of antennas 52, 53 (step S116).

The SRS is transmitted by using the second resource of which notification has been given in step S108 (step S117).

Then, SRS control unit 13 of wireless base station 1 receives the SRS (step S118).

Then, transmission path state estimation unit 9 of wireless base station 1 estimates a state of a transmission path to wireless terminal 51 based on the SRS received in step S118. Transmission unit 4 of wireless base station 1 forms directivity of the plurality of antennas 2, 3 based on the estimated state of the transmission path based on the estimated state of the transmission path and transmits the downlink user data as shown with (10) in FIG. 5 (step S119).

Then, reception unit 55 of wireless terminal 51 receives the downlink user data through the plurality of antennas 52, 53 (step S120).

As described above, according to the wireless communication system in the embodiment of the present invention, the wireless base station uses a DRS included in received uplink user data as a sounding signal for estimating a state of a transmission path after it determined a first resource from which downlink user data is transmitted, a second resource in which an SRS is received, and a third resource in which uplink user data including the DRS is received and until it receives the SRS, and after it received the SRS, it uses the received SRS as the sounding signal for estimating a state of the transmission path. Therefore, waste of a wireless resource can be avoided and a time period from determination of a wireless resource for downlink user data until actual transmission of the downlink user data by using that wireless resource can be decreased.

(Variation)

The present invention is not limited to the embodiment above, and also includes, for example, a variation as below.

(1) DRS

In the embodiment of the present invention, it has been assumed that the wireless base station determines a third resource for a wireless terminal to transmit uplink user data including a DRS and notifies that wireless terminal of the third resource, however, the embodiment is not limited thereto. In the case where the wireless base station has already received uplink user data from that wireless terminal, the DRS included in the uplink user data can be used for estimation of a state of a transmission path, and therefore it is not necessary to newly determine a third resource.

(2) SRS

In the embodiment of the present invention, the resource determination unit determines a part of an UpPTS (uplink part) within a switch subframe as a second resource for a wireless terminal to periodically transmit an SRS, however, the embodiment is not limited thereto.

For example, the resource determination unit may determine the entire UpPTS (uplink part) within the switch subframe as the second resource for the wireless terminal to periodically transmit an SRS.

Alternatively, the resource determination unit may determine a part within a switch subframe or of uplink subframe UL (for example, a last symbol) as the second resource for the wireless terminal to periodically transmit an SRS.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 wireless base station; 2, 3, 52, 53 antenna; 4, 54 transmission unit; 5, 55 reception unit; 6 downlink user data control unit; 7 resource determination unit; 8 resource notification unit; 9 transmission path state estimation unit; 10 uplink user data control unit; 11 network communication unit; 12 network; 13 SRS control unit; 51 wireless terminal; 57 user data control unit; and 58 sounding signal control unit.

The invention claimed is:

1. A wireless base station, comprising one or more controllers that:
    determine at least a part within any downlink subframe as a first resource for periodically transmitting downlink user data to a wireless terminal, and determine at least a part of an uplink part within a switch subframe or a part of an uplink subframe as a second resource for said wireless terminal to periodically transmit a first sounding reference signal;
    notify said wireless terminal of determined said second resource;
    estimate a state of a transmission path to said wireless terminal based on a second sounding reference signal included in uplink user data received from said wireless terminal after determination of said first resource and until reception of said first sounding reference signal from said wireless terminal, and estimate a state of a transmission path to said wireless terminal based on said first sounding reference signal after reception of said first sounding reference signal; and
    form directivity of a plurality of antennas based on estimated said state of the transmission path, and transmit said downlink user data through said first resource.

2. The wireless base station according to claim 1, wherein said one or more controllers:
    determine at least a part within any uplink subframe as a third resource for said wireless terminal to transmit, for a prescribed period, uplink user data including said second sounding reference signal; and
    notify said wireless terminal of determined said third resource.

3. The wireless base station according to claim 2, wherein said wireless base station is a wireless base station in a communication system adapted to an LTE (Long Term Evolution) scheme, and said uplink part is an UpPTS (Uplink Pilot Timeslot).

4. The wireless base station according to claim 3, wherein in said wireless base station, said one or more controllers determine said first resource, said second resource, and said third resource in accordance with a frame configuration of which Uplink-downlink configuration is "1".

5. A wireless communication method, comprising the steps of:
    determining at least a part within any downlink subframe as a first resource for periodically transmitting downlink user data to a wireless terminal and determining at least a part of an uplink part within a switch subframe or a part of an uplink subframe as a second resource for said wireless terminal to periodically transmit a first sounding reference signal;

notifying said wireless terminal of determined said second resource;

estimating a state of a transmission path to said wireless terminal based on a second sounding reference signal included in uplink user data received from said wireless terminal after determination of said first resource and until reception of said first sounding reference signal from said wireless terminal and estimating a state of a transmission path to said wireless terminal based on said first sounding reference signal after reception of said first sounding reference signal; and forming directivity of a plurality of antennas based on estimated said state of the transmission path and transmitting said downlink user data through said first resource.

* * * * *